US012103331B2

(12) United States Patent
Lee (10) Patent No.: US 12,103,331 B2
(45) Date of Patent: Oct. 1, 2024

(54) TRANSFORMABLE WHEEL AND LEG ASSEMBLY

(71) Applicant: Case Western Reserve University, Cleveland, OH (US)

(72) Inventor: Kiju Lee, College Station, TX (US)

(73) Assignee: Case Western Reserve University, Cleveland, OH (US)

( * ) Notice: Subject to any disclaimer, the term of this patent is extended or adjusted under 35 U.S.C. 154(b) by 483 days.

(21) Appl. No.: 17/233,754

(22) Filed: Apr. 19, 2021

(65) Prior Publication Data

US 2021/0323346 A1  Oct. 21, 2021

Related U.S. Application Data

(60) Provisional application No. 63/011,534, filed on Apr. 17, 2020.

(51) Int. Cl.
*B60B 19/04* (2006.01)
(52) U.S. Cl.
CPC ........ *B60B 19/04* (2013.01); *B60B 2900/551* (2013.01)
(58) Field of Classification Search
CPC ... B60B 19/04; B60B 2900/551; B60B 15/16; B62B 5/026; B62B 2301/25; A61G 5/06
See application file for complete search history.

(56) References Cited

U.S. PATENT DOCUMENTS

| | | | | |
|---|---|---|---|---|
| 2012/0319457 | A1* | 12/2012 | Jo | B60B 15/16 |
| | | | | 301/6.1 |
| 2013/0081885 | A1* | 4/2013 | Connor | B60B 19/02 |
| | | | | 180/8.2 |
| 2022/0126627 | A1* | 4/2022 | Sheffield | B60B 15/12 |
| 2023/0041624 | A1* | 2/2023 | Fujioka | B60B 19/02 |

FOREIGN PATENT DOCUMENTS

| | | | | |
|---|---|---|---|---|
| CN | 105459728 | A | * | 4/2016 |
| KR | 100995650 | B1 | * | 11/2010 |
| KR | 20120075027 | A | * | 7/2012 |
| KR | 20120133504 | A | * | 12/2012 |

* cited by examiner

*Primary Examiner* — Kip T Kotter
(74) *Attorney, Agent, or Firm* — Winstead PC

(57) ABSTRACT

A transformable wheel assembly includes a spoke frame and a central gear coupled to the spoke frame. A plurality of legs are pivotably coupled to the spoke frame. The plurality of legs include an arcuate outer surface and an arcuate distal interior edge. A plurality of leg teeth are formed on the arcuate distal interior edge. The leg teeth engage the central gear such that the central gear drives the plurality of legs between a closed position and an open position based on a direction of rotation of the central gear.

18 Claims, 10 Drawing Sheets

TRANSFORMABLE WHEEL AND LEG ASSEMBLY

CROSS-REFERENCE TO RELATED APPLICATIONS

This application claims priority to, and incorporates by reference the entire disclosure of, U.S. Provisional Patent Application No. 63/011,534, filed on Apr. 17, 2020.

TECHNICAL FIELD

The present disclosure relates generally to passively transformable wheels and more particularly, but not by way of limitation, to passively transformable wheels determined by the direction of travel.

BACKGROUND

This section provides background information to facilitate a better understanding of the various aspects of the disclosure. It should be understood that the statements in this section of this document are to be read in this light, and not as admissions of prior art.

Vehicular operations involve unique locomotion challenges due to coexisting built and natural environments, diverse obstacles, and staircases, which are ubiquitous in both outdoor and indoor environments. Wheels are the simplest, yet the most effective, locomotion strategy on flat, smooth surfaces. Wheels, however, exhibit limitations on irregular terrains, obstacles, or staircases. Legged locomotion is more versatile, but suffers from inherent structural, mechanical, and control complexities.

SUMMARY

Aspects of the disclosure relate to a transformable wheel assembly. The transformable wheel assembly includes a spoke frame and a central gear coupled to the spoke frame. A plurality of legs are pivotably coupled to the spoke frame. The plurality of legs include an arcuate outer surface and an arcuate distal interior edge. A plurality of leg teeth are formed on the arcuate distal interior edge. The leg teeth engage the central gear such that the central gear drives the plurality of legs between a closed position and an open position based on a direction of rotation of the central gear.

Aspects of the disclosure relate to a vehicle. The vehicle includes a body and a motor coupled to the body. A transformable wheel assembly is coupled to the body. The transformable wheel assembly includes a spoke frame and a central gear coupled to the spoke frame. A plurality of legs are pivotably coupled to the spoke frame. The plurality of legs are operatively coupled to the central gear such that the central gear drives the plurality of legs between a closed position and an open position based on a direction of rotation of the central gear.

Aspects of the disclosure relate to a method of driving a vehicle. The method includes coupling a central gear of a transformable wheel assembly to a motor and coupling a plurality of legs to the central gear such that a plurality of leg teeth formed on each leg of the plurality of legs interact with the central gear. The plurality of legs are passively moved between a closed position and an open position based on a direction of rotation of the central gear.

This summary is provided to introduce a selection of concepts that are further described below in the Detailed Description. This summary is not intended to identify key or essential features of the claimed subject matter, nor is it to be used as an aid in limiting the scope of the claimed subject matter.

BRIEF DESCRIPTION OF THE DRAWINGS

A more complete understanding of the subject matter of the present disclosure may be obtained by reference to the following Detailed Description when taken in conjunction with the accompanying Drawings wherein.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Figure 1:
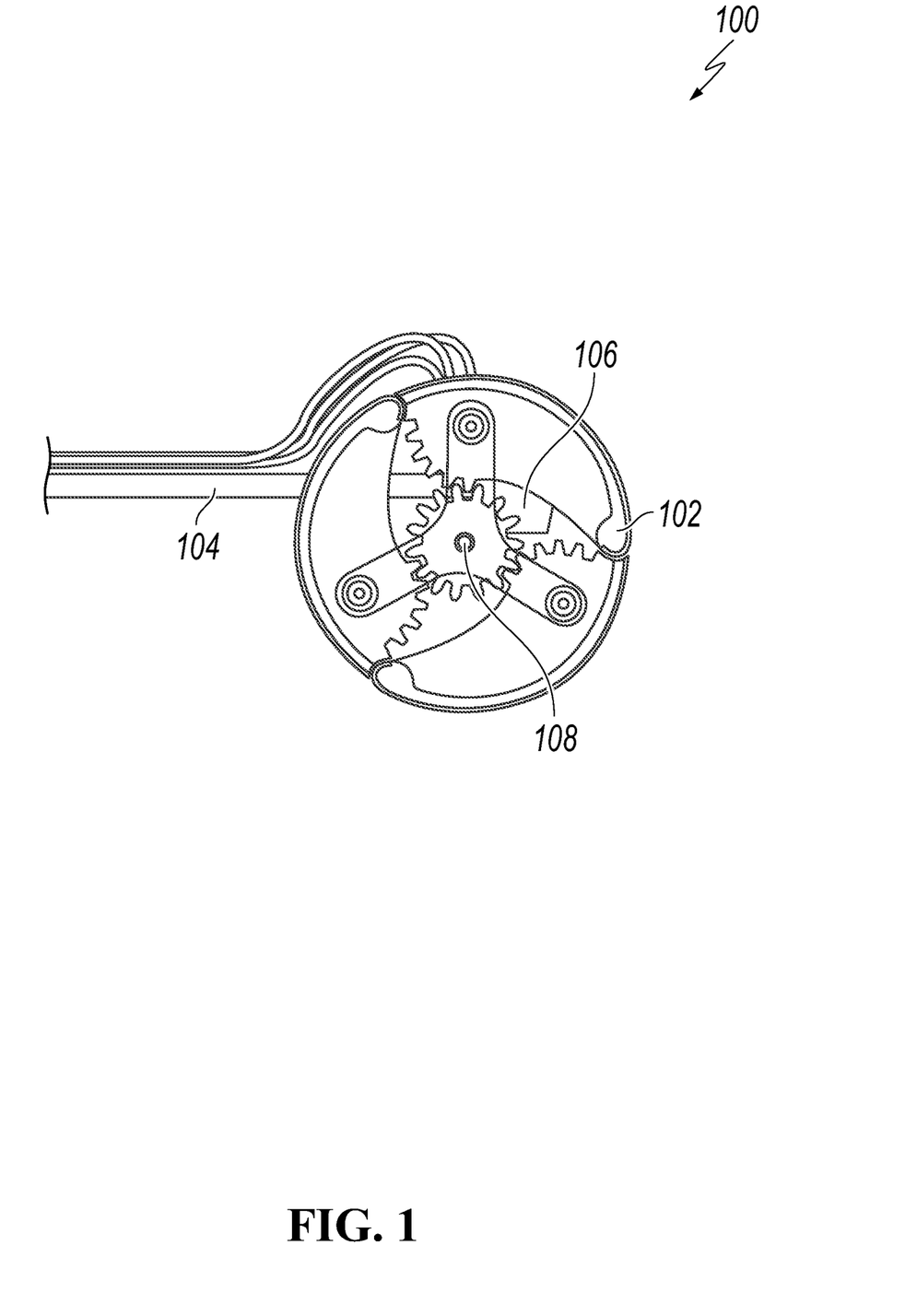
FIG. 1 is a front view of a transformable wheel assembly in a closed position according to aspects of the disclosure.
Figure 2:
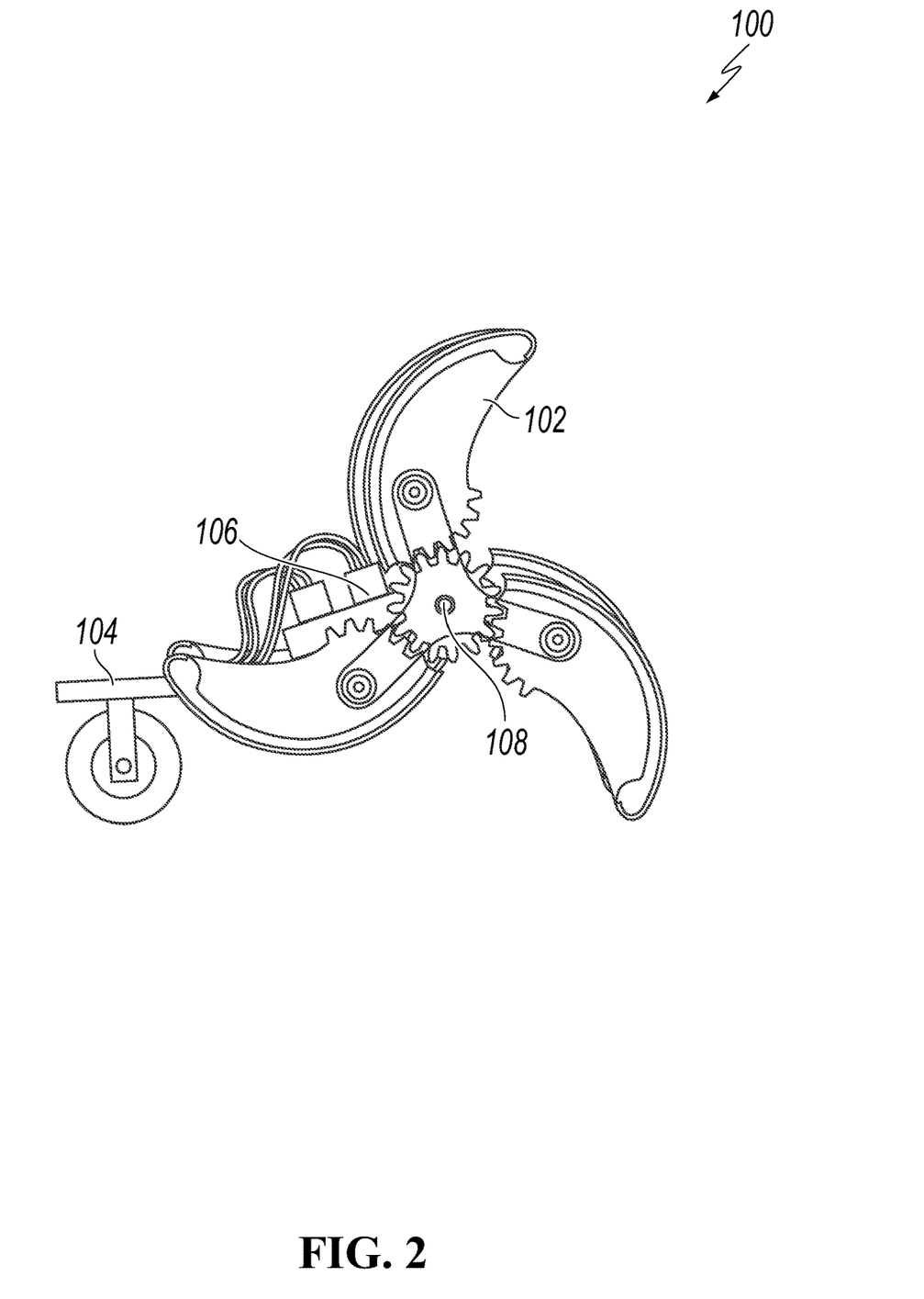
FIG. 2 is a front of the transformable wheel assembly in an open position according to aspects of the disclosure.

FIG. 1 is a front view of a vehicle 100 having a transformable wheel assembly 102 in a closed position. FIG. 2 is a front of the vehicle 100 having the transformable wheel assembly 102 in an open position. The vehicle includes a body 104. A motor 106 such as, for example, an electric motor is coupled to the body 104 and is arranged so as to provide torque to the transformable wheel assembly 102 via an axle 108. In various embodiments, the vehicle 100 may include one motor 106 that drives two or more of the transformable wheel assemblies 102; however, in other embodiments, the vehicle 100 may include multiple motors 106 with each motor 106 being arranged to drive a single transformable wheel assembly 102. Such an arrangement provides independent and individual control of the transformable wheel assemblies 102. In various embodiments, the vehicle 100 could be, for example, a robot, a manual cart, or a remote-controlled system.

Figure 3:
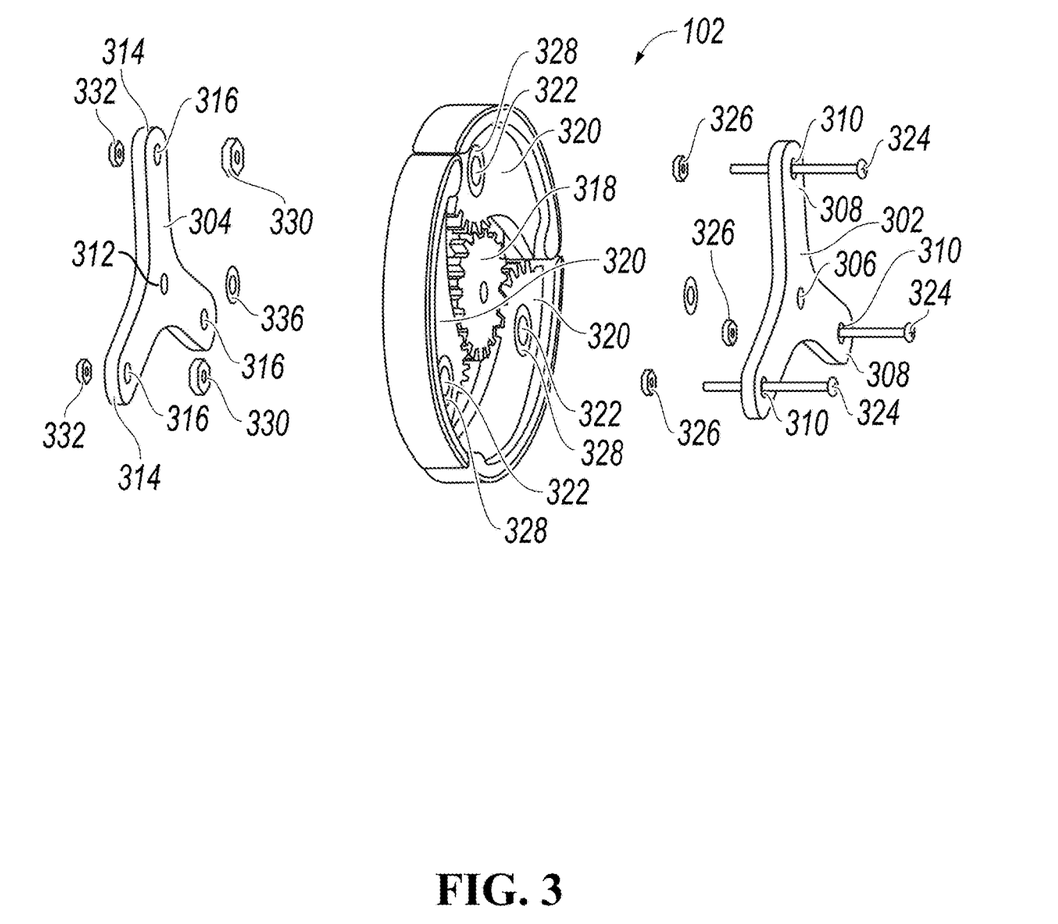
FIG. 3 is an exploded view of the transformable wheel assembly according to aspects of the disclosure.

FIG. 3 is an exploded view of the transformable wheel assembly 102. The transformable wheel assembly 102 includes a first spoke frame 302, and a second spoke frame 304. The first spoke frame includes a first central aperture 306 and a first plurality of spokes 308. Each spoke 308 of the first plurality of spokes 308 extends radially from the first central aperture 306. The spokes 308 of the first plurality of spokes 308 are arranged approximately equidistant around the first central aperture 306. Each spoke 308 of the first plurality of spokes 308 includes a first spoke aperture 310 formed therein.

Likewise, the second spoke frame 304 includes a second central aperture 312 and a second plurality of spokes 314. Each spoke 314 of the second plurality of spokes 314 extends radially from the second central aperture 312. The spokes 314 of the second plurality of spokes 314 are arranged approximately equidistant around the second central aperture 312. Each spoke 314 of the plurality of spokes 314 includes a second spoke aperture 316 formed therein.

Still referring to FIG. 3, a central gear 318 and a plurality of legs 320 are disposed between the first spoke frame 302 and the second spoke frame 304. By way of example, the transformable wheel assembly 102 is illustrated herein as having three legs 320; however, it will be understood that the transformable wheel assembly 102 could have any number of legs 320. For example, in various embodiments, the transformable wheel assembly 102 could have two legs 320, three legs 320, four legs 320, five legs 320, or six or more legs 320. Similarly, the first spoke frame 302 has been illustrated as having three spokes 308 and the second spoke frame 304 has been illustrated as having three spokes 314. In it will be understood, however, that the first spoke frame 302 and the second spoke frame 304 will each have a number of spokes (308, 314) that corresponds to the number of legs 320 present in the particular embodiment of the transformable wheel assembly 102. Thus, a transformable wheel assembly 102 having three legs 320 will have a first spoke frame 302 having three spokes 308 and a second spoke frame 304 having three spokes 314. By way of example, a transformable wheel assembly 102 having five legs 320 will include a first spoke frame 302 having five spokes 308 and a second spoke frame 304 having five spokes 314.

Still referring to FIG. 3, each leg 320 includes a leg aperture 322 formed in a proximal end of the leg 320. A fastener 324 such as, for example, a screw of bolt is passed through the first spoke aperture 310 of the first spoke frame 302 and through a first bearing holder 326. A bearing 328 is disposed in the leg aperture 322. The fastener 324 passes through the bearing 328 and through a second bearing holder 330 before passing through the second spoke aperture 316 formed in the second spoke frame 304. In various embodiments, the fastener 324 may be secured with, for example a nut or a bolt 332. In other embodiments, the second spoke aperture 316 may be threaded so as to facilitate direct securement of the fastener 324 to the second spoke frame 304 without the need for the nut or bolt 332.

Figures 4, 6:
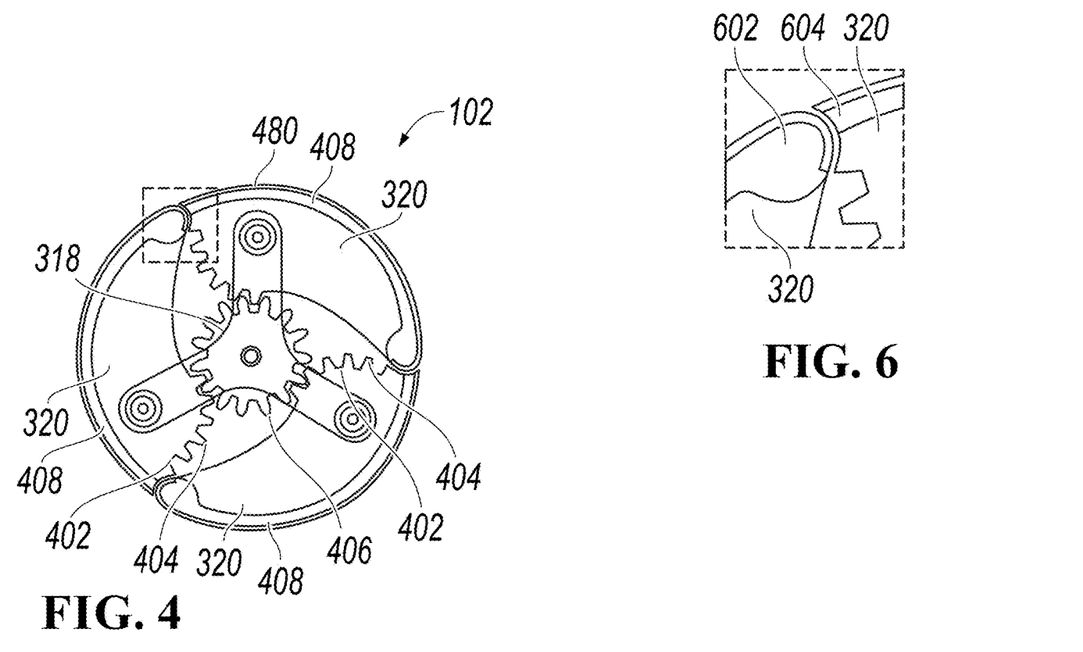
FIG. 4 is a perspective view of the transformable wheel assembly in the closed position according to aspects of the disclosure.
FIG. 6 is a detail view of a closed-position locking mechanism according to aspects of the disclosure.

FIG. 4 is a perspective view of the transformable wheel assembly 102 in the closed position. Each leg 320 includes an arcuate distal interior edge 402, which includes a plurality of leg teeth 404 formed thereon. The leg teeth 404 engage with teeth 406 formed on the central gear 318. The leg 320 includes an arcuate outer surface 408. In various embodiments, a traction-improving coating 480 such as, for example, rubber may be applied to the arcuate outer surface 408; however, in other embodiments, the traction-improving coating 480 may be omitted. The arcuate outer surface 408 defines a fractional portion of the circumference of the transformable wheel assembly 102 and a length of the leg 320 and the associated arcuate outer surface 408 depends on the number of legs 320 included in a particular embodiment of the transformable wheel assembly 102. By way of example, the transformable wheel assembly 102 illustrated in FIG. 4 includes three legs 320, thus the arcuate outer surface 408 accounts for approximately 120 degrees of the total circumference of the transformable wheel assembly 102. In an embodiment including, for example, four legs 320, the arcuate outer surface 408 would account for approximately 90 degrees of the total circumference of the transformable wheel assembly. When in the closed position, the arcuate outer surface 408 of one leg 320 abuts an arcuate outer surface 408 of an adjacent leg 320 thereby creating a smooth rolling surface for the transformable wheel assembly 102.

Figures 5, 7:
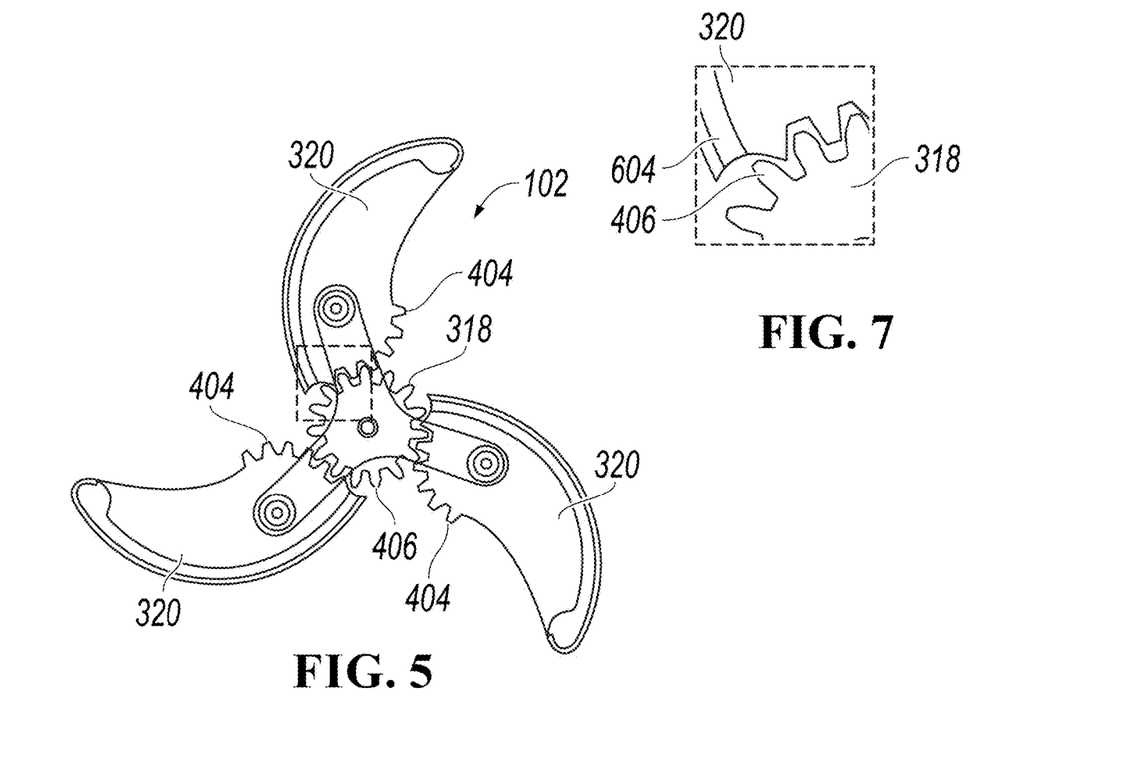
FIG. 5 is a perspective view of the transformable wheel assembly in the open position according to aspects of the disclosure.
FIG. 7 is a detail view of an open position locking mechanism according to aspects of the disclosure.

FIG. 5 is a perspective view of the transformable wheel assembly 102 in the open position. When the central gear 318 is driven in the clockwise direction, the teeth 406 engage the leg teeth 404 formed on the leg 320. Such interaction between the central gear 318 and the leg 320 causes the leg 320 to pivot about the fastener 324 and move to the open position. Once the legs 320 are in the open position, as the central gear 318 continues to rotate in the clockwise direction, the transformable wheel assembly 102 rotates in the clockwise direction thereby causing the transformable wheel assembly 102 to assume a "walking" form of movement. Thus, the transformable wheel assembly 102 is capable of passive transformation between the closed position and the open position dependent on the direction of rotation of the central gear 318.

FIG. 6 is a detail view of a closed-position locking mechanism. Each leg 320 includes a rounded distal end 602 and a proximal tail 604. When in the closed position, the rounded distal end 602 of a first leg 320 interferes with the proximal tail 604 of an adjacent leg 320. In various embodiments, the interaction between the rounded distal end 602 and the proximal tail 604 causes the leg 320 to have a frictional engagement with the adjacent leg 320 and results in the leg exhibiting a "snap-together" appearance when moving to the closed position. In such embodiments, the interaction between the rounded distal end 602 and the proximal tail 604 creates a frictional resistance to the leg 320 moving to the open position. In such embodiments, the leg 320 will not move to the open position until the torque applied to the leg 320 by the central gear 318 exceeds the friction between the rounded distal end 602 and the proximal tail 604. In various other embodiments, the interaction of the rounded distal end 602 with the proximal tail 604 does not create a frictional resistance to the legs 320 moving to the open position but creates a smooth rolling surface of the transformable wheel assembly 102 when the legs 320 are in the closed position.

FIG. 7 is a detail view of an open position locking mechanism. When in the open position, the proximal tail 604 abuts the teeth 406 of the central gear 318 and prevents further movement of the leg 320 relative to the central gear 318. Such action holds the leg 320 in the open position while the central gear 318 moves in the clockwise direction.

Figure 8:
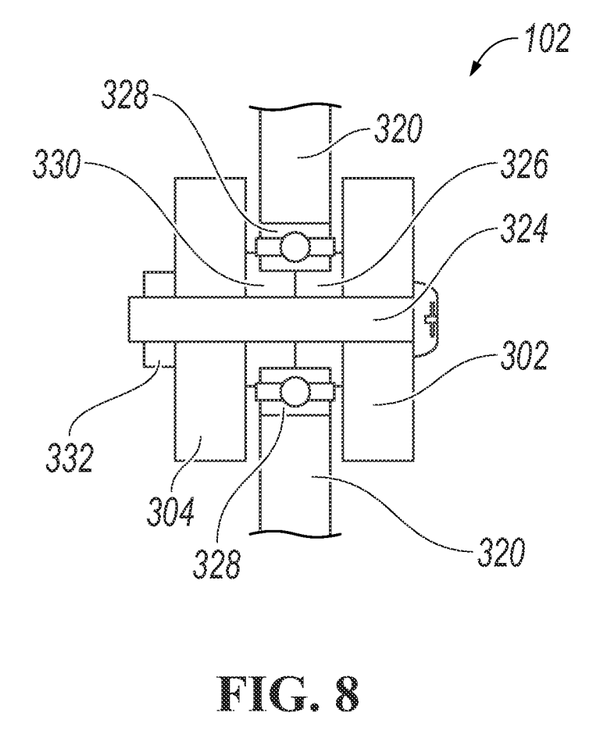
FIG. 8 is a cross-sectional view of the transformable wheel assembly taken along line A-A of FIG. 4 according to aspects of the disclosure.

FIG. 8 is a cross-sectional view of the transformable wheel assembly 102 taken along line A-A of FIG. 4. Once assembled, the first bearing holder 326 abuts the second bearing holder 330 and separates the bearing 328 from the fastener 324. The bearing 328 is illustrated in FIG. 8 as, for example, a ball bearing; however, it will be understood that the bearing 328 could be, for example, a journal bearing or any other type of bearing operable to reduce friction between the leg 320 and the fastener 324. In still other embodiments, the bearing 328, the first bearing holder 326, and the second bearing holder 330 may be omitted.

Figure 9A:
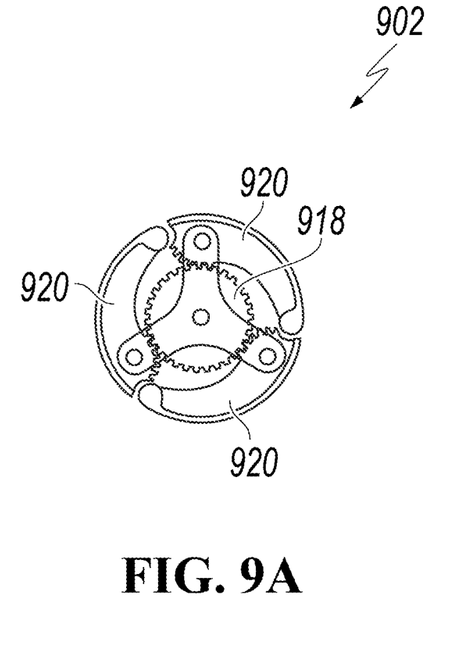
FIGS. 9A and 9B are plan views of a three-leg transformable wheel assembly with a large gear ratio according to aspects of the disclosure.
Figure 9B:
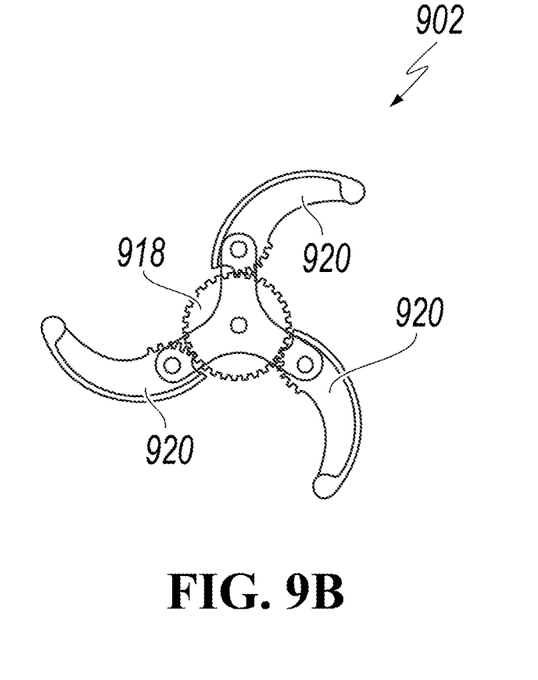
Figure 10A:
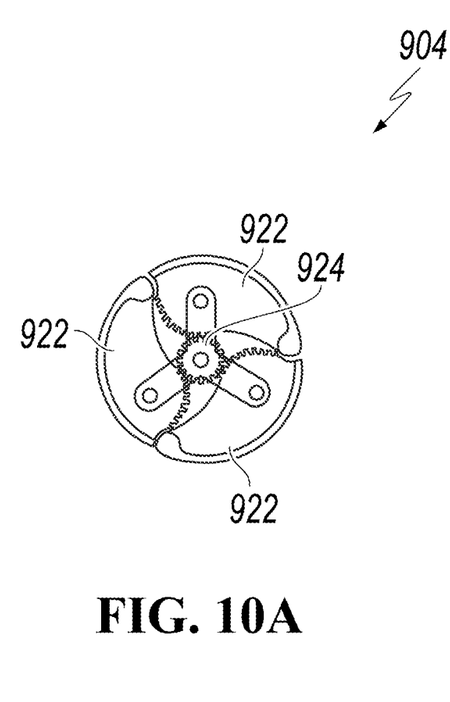
FIGS. 10A and 10B are plan views of a three-leg transformable wheel assembly with a lower gear ratio according to aspects of the disclosure.
Figure 10B:
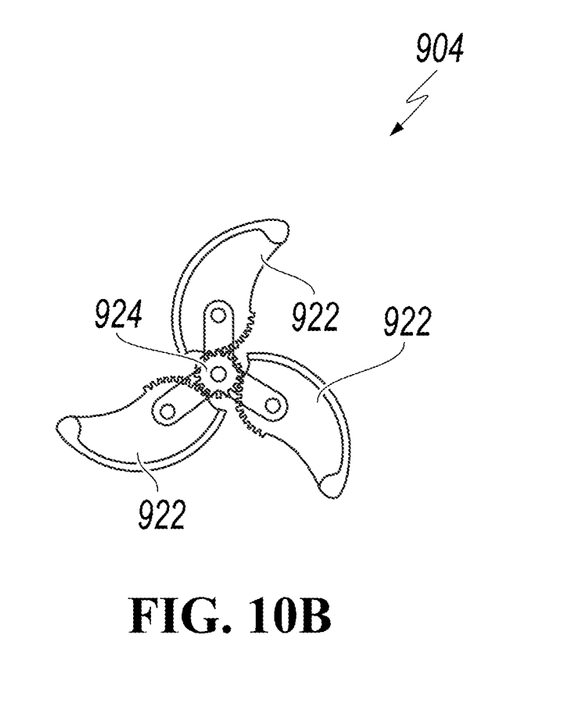

FIGS. 9A and 9B are plan views of a three-leg transformable wheel assembly 902 with a first gear ratio FIGS. 10A and 10B are plan views of a three-leg transformable wheel assembly 904 with a second gear ratio. As illustrated in FIGS. 9A and 9B, the gear ratio between a central gear 918 and legs 920 may be varied in an effort to achieve various opening torques and speeds. By way of example, the transformable wheel assembly 902 shown in FIGS. 9A and 9B include a central gear 918 with a larger number of teeth while the legs 320 include fewer leg teeth. Such an arrangement will cause the legs 920 of the transformable wheel assembly 902 to open more quickly than the legs 922 of the transformable wheel assembly 904 shown in FIGS. 10A and 10B, which exhibits a central gear 924 with fewer teeth. As illustrated in FIGS. 9A, 9B, 10A, and 10B, the gear ratio between the central gear and the legs will determine the shape of the legs and the number of leg teeth present on the legs.

Figure 11A:
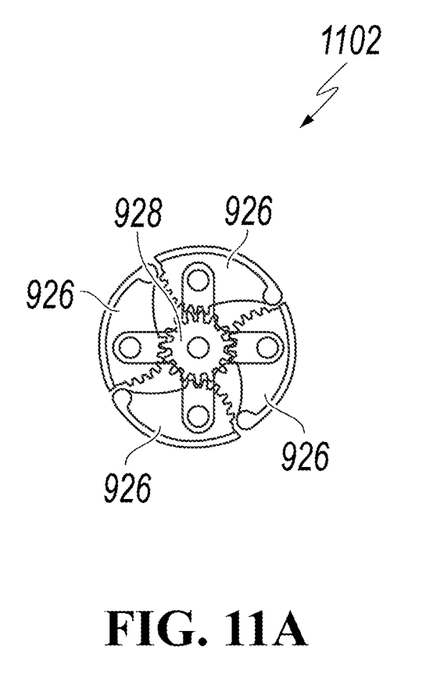
FIGS. 11A and 11B are plan views of a four-leg transformable wheel assembly according to aspects of the disclosure.
Figure 11B:
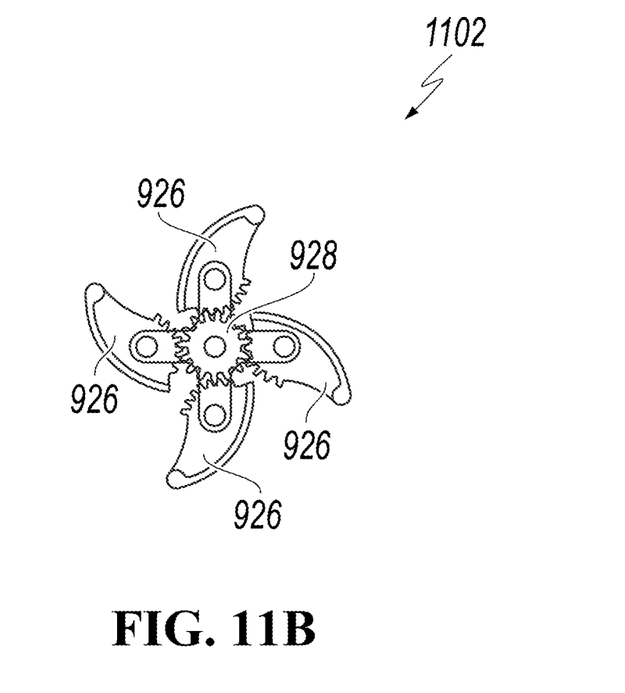
Figure 12A:
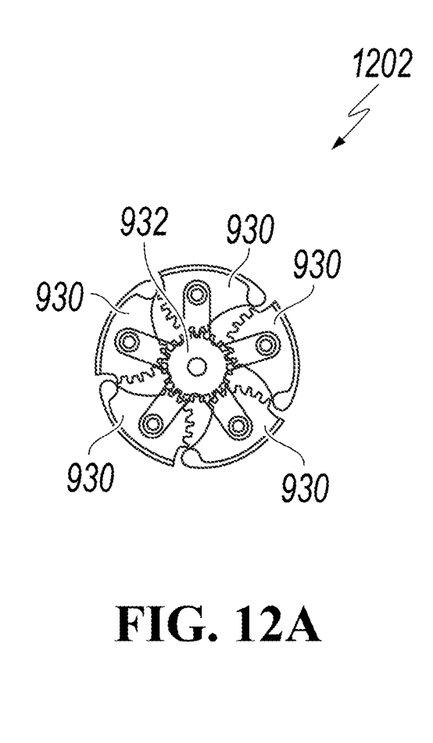
FIGs. 12A and 12B are plan views of a five-leg transformable wheel assembly according to aspects of the disclosure.
Figure 12B:
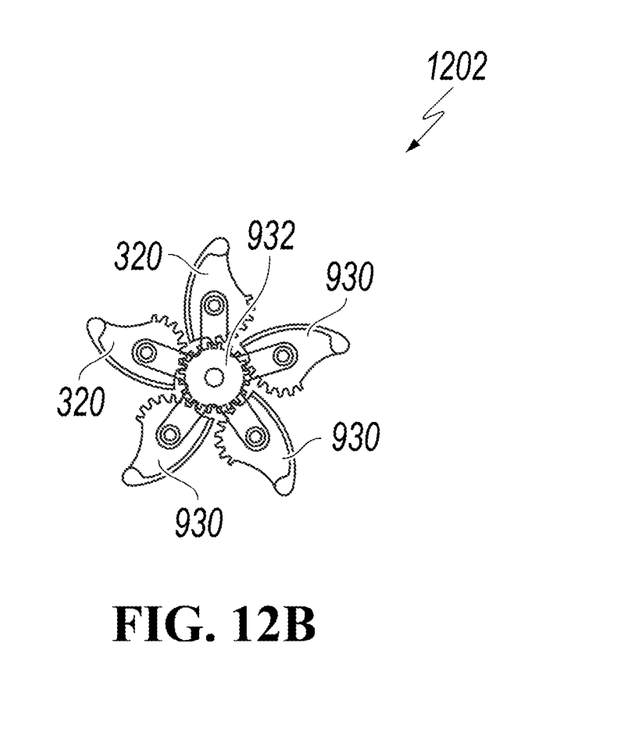

FIGS. 11A and 11B are plan views of a four-leg transformable wheel assembly 1102 including four legs 926 about a central gear 928. FIGS. 12A and 12B are plan views of a five-leg transformable wheel assembly 1202 including five legs 930 about a central gear 932. Referring to FIGS. 11A, 11B, 12A, and 12B collectively, the transformable wheel may, in various embodiments, include any number of legs.

Figure 13:
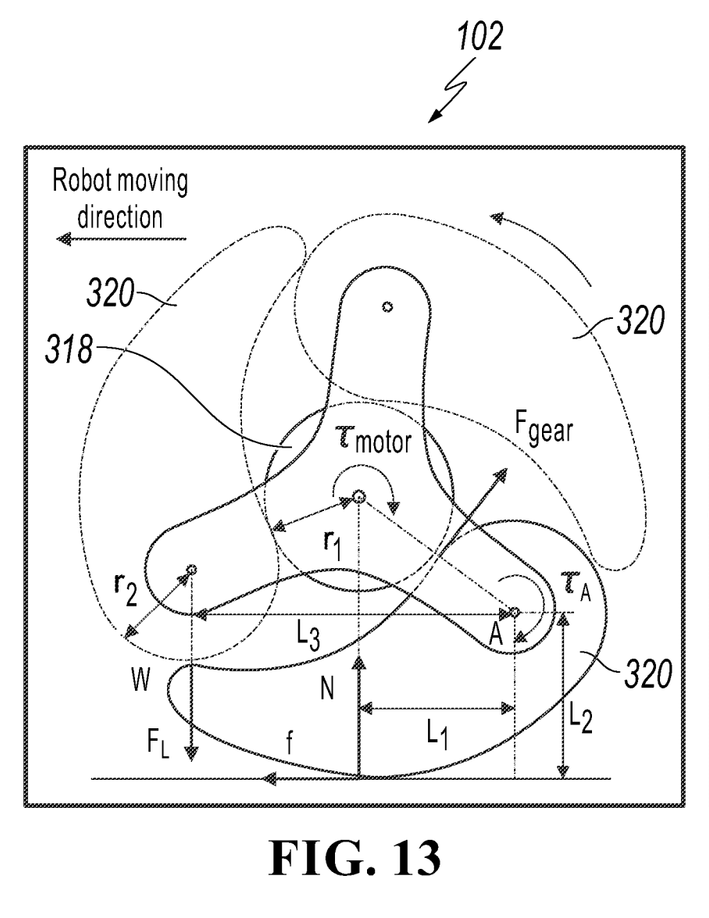
FIG. 13 is a free-body diagram of the transformable wheel assembly in the closed position according to aspects of the disclosure.
Figure 14:
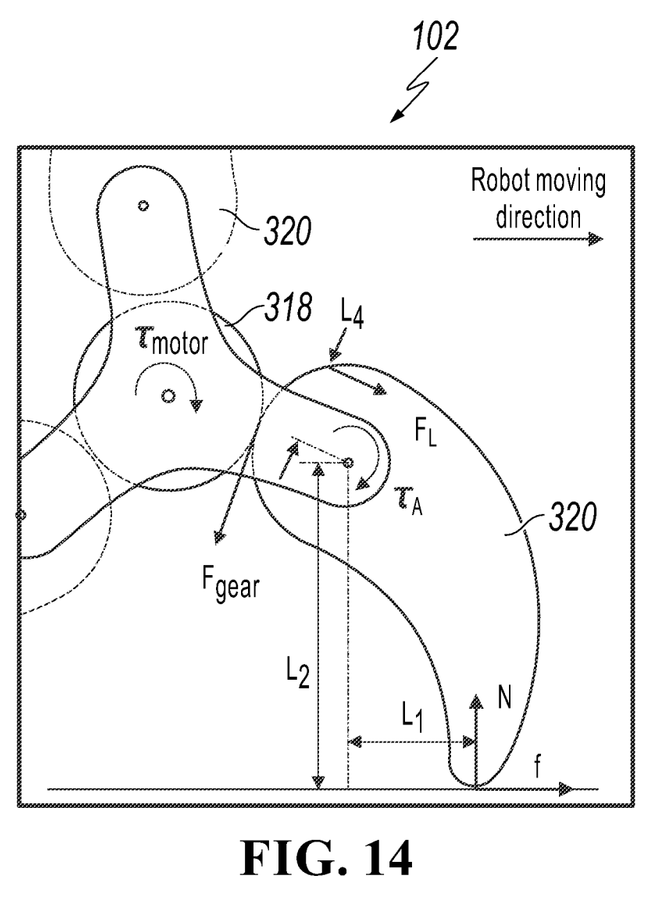
FIG. 14 is a free-body diagram of the transformable wheel assembly in the open position according to aspects of the disclosure.
Figure 15:
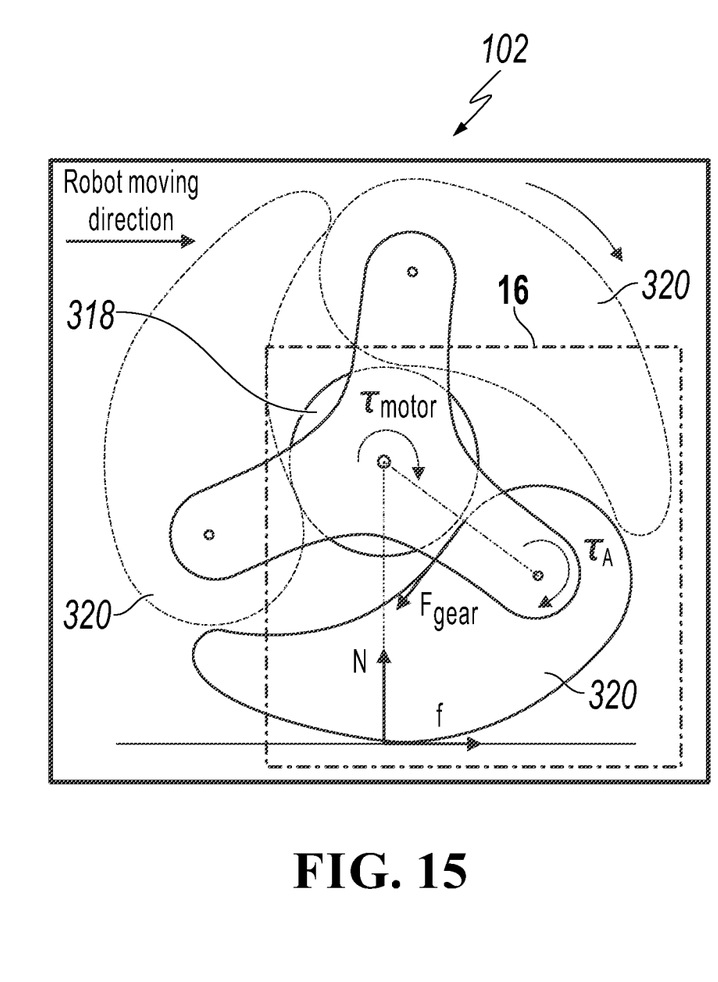
FIG. 15 is a free-body diagram of the transformable wheel assembly in the closed position and driven in the clockwise direction according to aspects of the disclosure.
Figure 16:
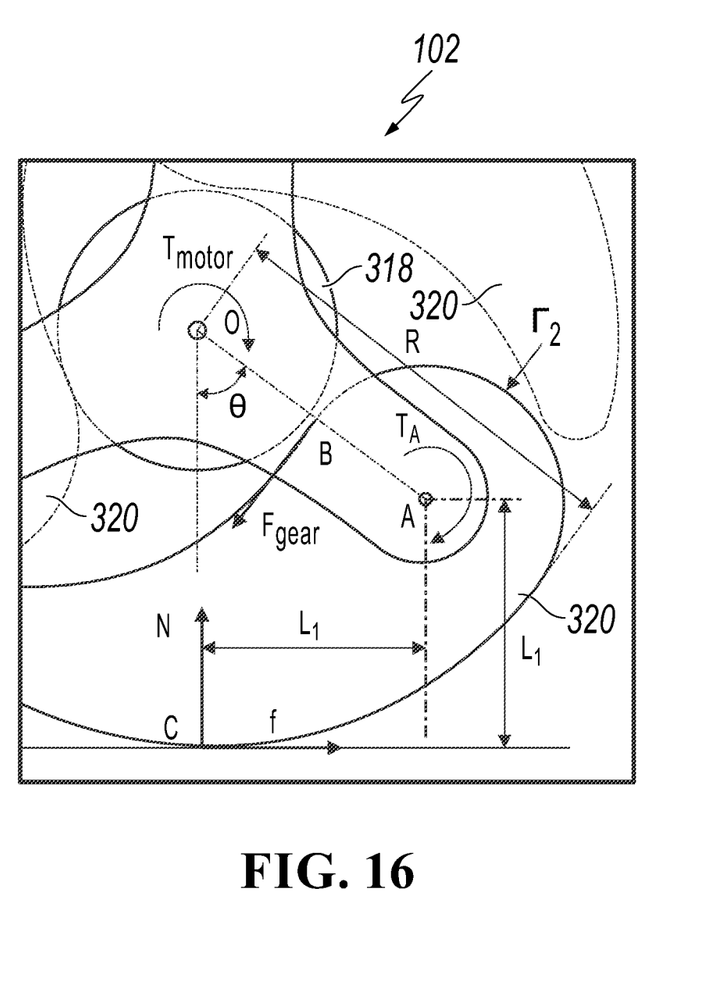
FIG. 16 is a detail view of the gear interaction of FIG. 15 according to aspects of the disclosure.
Figure 17:
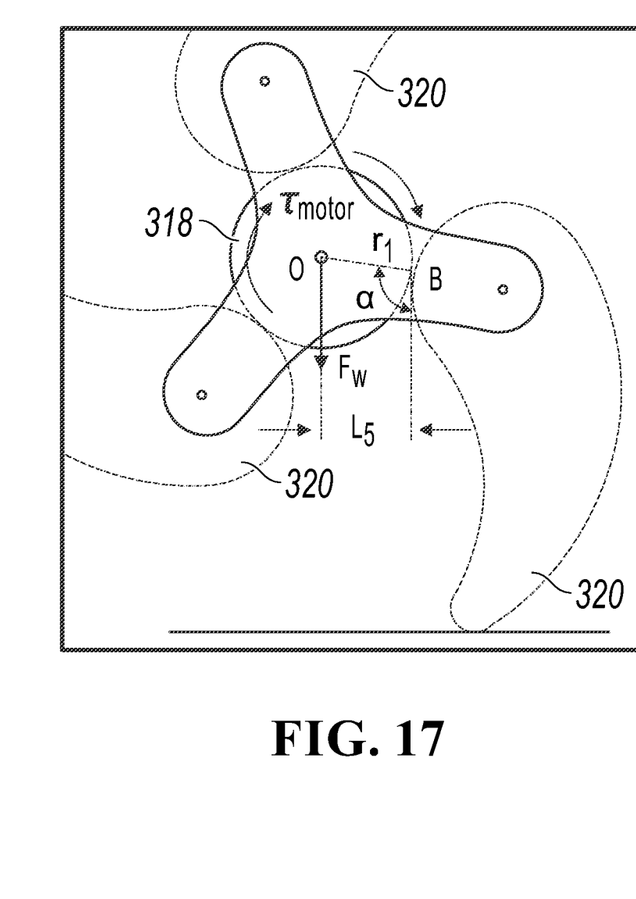
FIG. 17 is a free-body diagram of the transformable wheel assembly during opening according to aspects of the disclosure.
Figure 18:
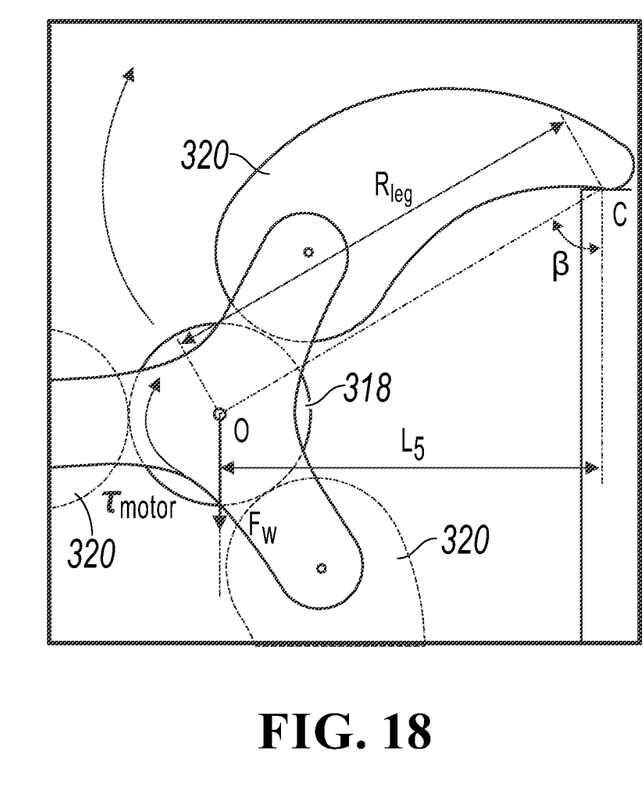
FIG. 18 is a free-body diagram of the transformable wheel assembly upon encountering an obstacle according to aspects of the disclosure.

FIG. 13 is a free-body diagram of the transformable wheel assembly 102 in the closed position. The transformable wheel assembly 102 operates in two modes: turning in the counter-clockwise direction, the transformable wheel assembly 102 operates in a circular wheel configuration (closed position) and turning in the clockwise direction allows the legs 320 to open (open position). In the open position, depending on the design parameters and external conditions, the legs 320 may remain open or dynamically switch between the closed and open positions. Due to the passive design of the transformable wheel assembly 102, the legs 320 may remain closed when operating on a smooth terrain and passively open when the friction or force applied to the legs 320 via encountering an obstacle is high enough to trigger the transition between the closed position and the open position. With a smaller central gear 318 and larger leg gears (higher tendency to open), the transformable wheel assembly 102 may open immediately to the open position when the central gear 318 is rotating in the clockwise direction. FIG. 13 shows the torques and forces applied to the structure with the legs 320 closed. FIG. 14 is a free-body diagram of the transformable wheel assembly 102 in the open position. FIG. 15 is a free-body diagram of the transformable wheel assembly 102 in the closed position and driven in the clockwise direction. FIG. 16 is a detail view of the gear interaction of FIG. 15. FIG. 17 is a free-body diagram of the transformable wheel assembly 102 during opening. FIG. 18 is a free-body diagram of the transformable wheel assembly 102 upon encountering an obstacle. Referring now to FIGS. 13-18 collectively, when rotating in the counter-clockwise direction with the legs 320 closed, the leg 320 in contact with the ground is subjected to three forces: N, the reactive force from the ground to support the wheel; f, the friction force from the ground; and $F_{gear}$, the driving force from the central gear. The point "A" is the shaft around which the leg 320 can freely rotate. In this case, the applied torque $\tau_A$ about the axis A must be greater than zero, according to Equation 1.

$$\tau_A = F_{gear} r_2 + NL_1 + fL_2 > 0 \qquad \text{Equation 1:}$$

where the clockwise rotation direction is positive. $L_1$ and $L_2$ are the horizontal and vertical distances between A and the ground contact point C, respectively. In the closed position, each leg 320 makes contact with another leg at point W, resulting in a reactive force, $F_L$ according to Equation 2

$$\tau_A = F_{gear} r_2 + NL_1 + fL_2 - FL = 0. \qquad \text{Equation 2:}$$

When the legs 320 are fully open while the central gear 318 rotates in the clockwise direction as shown in FIG. 14, $\tau_A$ is represented according to Equation 3.

$$\tau_A = -F_{gear} r_2 - NL_1 - fL_2 < 0 \qquad \text{Equation 3:}$$

The negative value of $\tau_A$ results in the leg 320 moving to the open position. A mechanical lock at the end of the proximal tail 604 on the leg 320 keeps the leg in a fully opened position, defined by Equation 4.

$$\tau_A = -F_{gear} r_2 - NL_1 - fL_2 + F_L' = 0 \qquad \text{Equation 4:}$$

$\tau_A$ is positively proportional to $\varphi$, which is a function of k, p, $r_{sum}$ and $\theta$ as shown in Equation 5.

$$\phi(k, p, r_{sum}, \theta) = r_{sum} \cdot \sin\theta - p + 1 - \frac{(1+p)\cos\theta}{2p+1} k \qquad \text{Equation 5}$$

Since $\theta$ is a variable and k cannot be customized, the analysis focuses on evaluating the effect of p and $r_{sum}$ on the torque requirement. Given N, a higher value of $\varphi$ indicates a higher torque, $\tau_A$, required to trigger the transition from closed to open position. Therefore, the lower the value of $\varphi$ the easier transition is from the closed to the open position. Also, as k increases, $\varphi$ decreases. To increase (or decrease) k, the coating 410 with a desired property may be used along the arcuate outer surface 408 of the transformable wheel assembly 102. The transformable wheel assembly 102 with a larger gear ratio, such as the transformable wheel assembly 904 shown in FIG. 10, with, for example, p=2 can be more easily triggered to open the legs 320 than a transformable wheel assembly 902 with p=1 or p=0.5. In addition, reducing the overall wheel size can ease the triggering process.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an," and other singular terms are intended to include the plural forms thereof unless specifically excluded.

What is claimed is:

1. A transformable wheel assembly, comprising:
    a spoke frame;
    a central gear coupled to the spoke frame;
    a plurality of legs pivotably coupled to the spoke frame, each leg of the plurality of legs comprising:
        an arcuate outer surface;
        an arcuate distal interior edge;
        a rounded distal end comprising a first curve;
        a proximal tail comprising a second curve configured to matingly engage the first curve of an adjacent leg of the plurality of legs and comprising an edge that abuts teeth of the central gear to hold the leg in the open position while the central gear rotates in a first direction; and
        a plurality of leg teeth formed on the arcuate distal interior edge;
    wherein, the leg teeth engage the teeth of the central gear such that the central gear drives the plurality of legs between an open position when the central gear rotates in the first direction and a closed position when the central gear rotates in a second direction.

2. The transformable wheel assembly of claim 1, wherein the arcuate outer surface defines a fractional portion of a circumference of the transformable wheel assembly.

3. The transformable wheel assembly of claim 1, wherein the arcuate outer surface of a first leg of the plurality of legs abuts an arcuate outer surface of an adjacent leg of the plurality of legs thereby creating a smooth rolling surface for the transformable wheel assembly.

4. The transformable wheel assembly of claim 1, wherein interaction of the rounded distal end of a first leg of the plurality of legs with the proximal tail of an adjacent leg of the plurality of legs creates a frictional resistance to the leg moving to the open position.

5. The transformable wheel assembly of claim 1, wherein a gear ratio between the central gear and the plurality of legs determines a magnitude of torque require to move the plurality of legs to the open position.

6. The transformable wheel assembly of claim 1, wherein rotation of the central gear in a clockwise direction drives the plurality of legs to the open position.

7. The transformable wheel assembly of claim 1, wherein rotation of the central gear in a counterclockwise direction drives the plurality of legs to the closed position.

8. A vehicle comprising:
    a body;
    a motor coupled to the body;
    a transformable wheel assembly coupled to the body, the transformable wheel assembly comprising:
        a spoke frame;
        a central gear coupled to the spoke frame; and
        a plurality of legs pivotably coupled to the spoke frame, the plurality of legs operatively coupled to the central gear such that the central gear drives the plurality of legs between an open position when the central gear rotates in a first direction and a closed position when the central gear rotates in a second direction, each leg of the plurality of legs comprising:
            a rounded distal end comprising a first curve; and
            a proximal tail comprising a second curve configured to matingly engage the first curve of an adjacent leg of the plurality of legs and comprising an edge that abuts teeth of the central gear to hold the leg in the open position while the central gear rotates in a first direction.

9. The vehicle of claim 8, wherein the transformable wheel assembly comprises two legs.

10. The vehicle of claim 8, wherein the transformable wheel assembly comprises three legs.

11. The vehicle of claim 8, wherein the transformable wheel assembly comprises four legs.

12. The vehicle of claim 8, wherein the transformable wheel assembly comprises five legs.

13. The vehicle of claim 8, wherein the transformable wheel assembly comprises six legs.

14. A method of driving a vehicle, the method comprising:
    coupling a plurality of legs to a central gear such that a plurality of leg teeth formed on each leg of the plurality of legs interact with the central gear, each leg of the plurality of legs comprising:
        a rounded distal end coomprising a first curve; and
        a proximal tail comprising a second curve configured to matingly engage the first curve of an adjacent leg of the plurality of legs and comprising an edge that abuts teeth of the centeral gear to hold the leg in the open position while the central gear rotates in a first direction; and
    passively moving the plurality of legs between an open position when the central gear rotates in a first direction and a closed position when the central gear rotates in a second direction.

15. The method of claim 14, comprising moving the plurality of legs to the open position by rotating the central gear in a clockwise direction.

16. The method of claim 14, comprising moving the plurality of legs to the open position by rotating the central gear in a clockwise direction.

17. The method of claim 14, comprising securing the plurality of legs in the closed position.

18. The method of claim 14, comprising securing the plurality of legs in the open position.

* * * * *